(12) United States Patent
Nakata et al.

(10) Patent No.: US 6,212,149 B1
(45) Date of Patent: Apr. 3, 2001

(54) MODIFIED LIGHT-RECEIVING ELEMENT IN AN OPTICAL PICKUP FOR READING OPTICAL DISCS

(75) Inventors: Naotaro Nakata; Takeshi Yamamoto, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/193,766

(22) Filed: Nov. 17, 1998

(30) Foreign Application Priority Data

Nov. 21, 1997 (JP) .................................................. 9-320685
Nov. 26, 1997 (JP) .................................................. 9-324931

(51) Int. Cl.$^7$ ................................................... G11B 7/00
(52) U.S. Cl. .................. 369/109; 369/112.12; 369/44.42
(58) Field of Search ............................ 369/44.41, 44–42, 369/112, 110, 109, 103

(56) References Cited

U.S. PATENT DOCUMENTS 4,904,856 * 2/1990 Nagaham et al. ................. 369/44.42
4,926,036 * 5/1990 Maeda ................................ 369/44.42
6,014,359 * 1/2000 Nagano ................................. 369/109
6,072,607 * 6/2000 Tajiri et al. ........................... 369/109

FOREIGN PATENT DOCUMENTS 5-9851    6/1989  (JP) .

* cited by examiner

*Primary Examiner*—Nabil Hindi
(74) *Attorney, Agent, or Firm*—Hoffmann & Baron, LLP

(57) ABSTRACT

An optical pickup includes a photo-detector. The photo-detector is structured by light receiving elements on one of which a blind zone is formed. If a relationship between an output of the light receiving element formed with a blind zone and a lens position is displayed as a graph on a measurement signal output device, a point that a beam converges on the blind zone, i.e., a point that a spot size assumes a minimum, is displayed as an edge. In the photo-detector, a region for receiving a sub-beam on light shield side, i.e., one sub-beam having a grater spot size, has a width broader than a width of a region for receiving a sub-beam on an aperture side, i.e., another sub-beam smaller in spot size.

13 Claims, 7 Drawing Sheets

| APERTURE-SIDE 1ST ORDER LIGHT 60% | 0TH ORDER LIGHT 50% | LIGHT-SHIELD SIDE 1ST ORDER LIGHT 40% |

FIG. 7 PELATION BETWEEN TEMPERATURE AND TRUCKING ERROR BALANCE
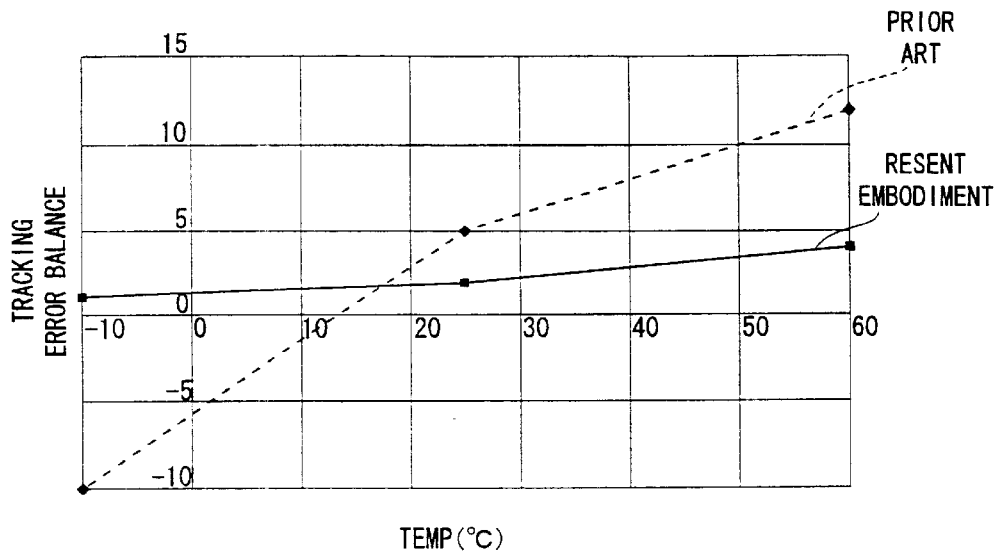
FIG. 8 PELATION BETWEEN TEMPERATURE AND JITTER
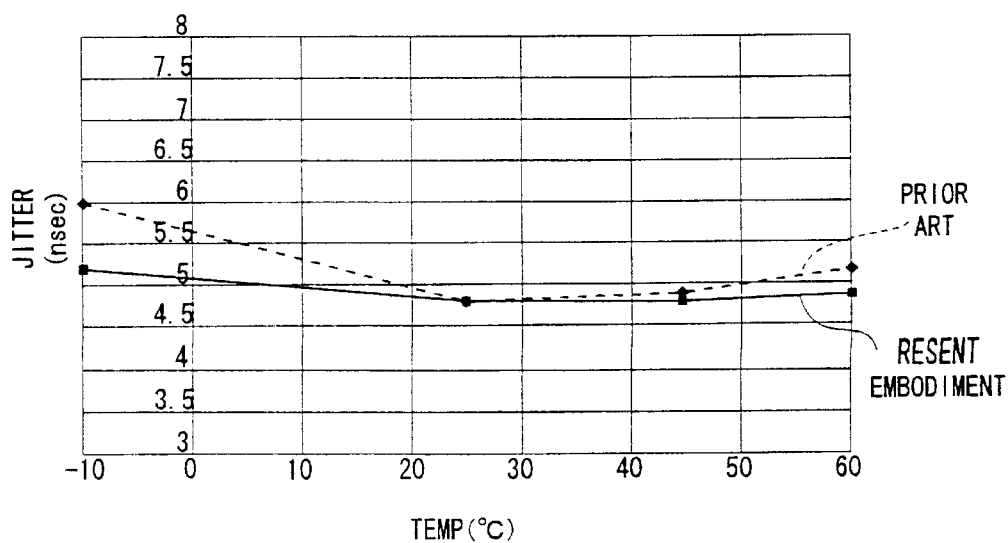

MODIFIED LIGHT-RECEIVING ELEMENT IN AN OPTICAL PICKUP FOR READING OPTICAL DISCS

BACKGROUND OF THE INVENTION

1. Field of the Invention

This invention relates to optical pickups. More particularly, the invention relates to an optical pickup used to read information out of an optical disc (hereinafter referred merely to as "disc") such as CD and DVD.

2. Description of the Prior Art

There is one example of an optical pickup adapted to read information out of a disc as disclosed in Japanese Patent Publication No. H5-9851 [G11B7/09, G02B7/28, G11B7/135]. The optical pickup of this kind is required to have functions to detect focusing and tracking errors, in addition to the function to reproduce record information. Conventionally, the well-known Foucault's method, astigmatic method and the like have been utilized to detect focusing errors while the push-pull method, three-beam method and the like have been used to detect tracking errors. Where using the Foucault×s method and the three-beam method in combination, a photo-detector 1 has been used which includes light receiving elements 2a–2c for receiving a main beam and light receiving elements 3a and 3b for receiving sub-beams. Due to this, a focusing error signal is determined from a difference (S2a–S2b) of between output signals of the light receiving elements 2a and 2b, while a tracking error signal is determined by a difference (S3a–S3b) between output signals of the light receiving elements 3a and 3b.

In general, the reflected light sub-beam from the disc travels through the lens in a somewhat oblique fashion. Accordingly, the two sub-beams separated by a diffraction elements 4 are not even but different in spot size. That is, the separated two beams include one beam greater in spot size (hereinafter referred to as "light-shield") and another beam smaller in spot size (hereinafter referred to as "aperture"). Due to this, the beam portion diffracted as an aperture side and the beam portion diffracted as a light-shield side will not constitute symmetry on a light receiving surface of the photo-detector 1. On the light receiving surface, the beam B as a light-shield side is greater in spot size than the beam A as an aperture side.

In the photo-detector 1 for a conventional optical pickup, such a phenomenon as stated above is not taken into consideration in design. That is, the light receiving elements 3a, 3b are each formed in a constant width throughout its entire length, with the result that the beam B on the light-shield side tends to go out of the light receiving elements 3a, 3b as shown in FIG. 13. Due to this, there has been a problem that tracking error balance or jitter is greatly varied by change of temperature, resulting in instability in optical pickup characteristics.

Meanwhile, when adjusting the positional relationship between the diffraction element 4 and the light receiving element 1 in the optical pickup of this kind, focusing servo is effected by employing a servo circuit while actually rotating the disc to displace the diffraction element 4 such that jitter values observed by a jitter meter exhibit a best. Due to this, there has been a problem that operation of adjustment is troublesome and time consuming. Further, the requirement of a servo circuit leads to increase in cost. In addition, there has also been a problem that the optical pickup is unstable in characteristic because the diffraction element is displaced by using as a reference a jitter value that is liable to suffer from noises.

SUMMARY OF THE INVENTION

Therefore, it is a primary object of the present invention to provide a novel optical pickup.

It is another object of this invention to provide an optical pickup which is easy to conduct adjustment.

It is still another object to provide an optical pickup which can stabilize a defocusing characteristic.

An optical pickup according to the present invention, comprises: a laser element for emitting laser light; a lens for causing the laser light to converge on a disc; a diffraction element having first and second region each of which diffracts reflection light from the disc; a photo-detector for receiving the reflection light traveled through the diffraction element, the photo-detector includes a first light receiving element on which the reflection light diffracted by the first region converges, a second light receiving element on which the reflection light diffracted by the second region converges and a third light receiving element, the second light receiving element and the third light receiving element being separated by a divisional line extending almost in a same direction as a direction of diffraction by the second region; and a blind zone for dividing a light receiving surface of the first light receiving element into two.

An optimal jitter value can be obtained while preventing against focusing offset, if the diffraction element is displaced such that an intersection of between second and third waveforms each representative of a relationship between a lens position in a direction perpendicular to a disc surface and output values of second and third light receiving elements, i.e., a point for which focusing servo is made, is superimposed on a center point in a maximum value range of the first waveform representative of the relationship between the lens position and the output value of the first light receiving element, i.e., on a point at which the spot size becomes minimum.

In the present invention, because the blind zone is provided to divide the light receiving surface of the first light receiving element into two, the first waveform has a point (edge) decreased in the output value of the first light receiving element appearing at a center of the maximum value range. Accordingly, if the edge point is taken as a mark, it is possible to easily perform positional adjustment between the diffraction element and the photo-detector. Also, cost reduction is possible because of no necessity of separately providing a servo circuit, etc. Furthermore, the optical pickup is stabilized in characteristic because an optimal jitter value is obtained by reducing the spot size to a minimum at a point where focusing servo is effected.

In one aspect of the present invention, an optical pickup, comprises: a splitting element which splits a laser beam from a laser element into one main beam and two sub-beams; a lens for causing the main beam and the sub-beams to converge on a disc; a diffraction element divided into first and second regions to diffract reflection light from the disc; a photo-detector for receiving the reflection light traveled through the diffraction element, the photo-detector including first and second light receiving portions for respectively receiving the main beam and the sub-beams diffracted by the first region and the second region; the second light receiving portion being broader in width at a light shield side region, for receiving the sub-beam diffracted as a light shield side by the diffraction element, than a width at an aperture side region, for receiving the sub-beam diffracted as an aperture side.

On the light receiving surface of the second light receiving portion of the photo-detector, the sub-beam diffracted as the light shield side by the diffraction element is greater in width than the sub-beam diffracted as the aperture side by the diffraction element. However, because the light shield side region for receiving the light-shield-side sub-beam has a width broader than a width of the aperture side region for receiving the aperture-side sub-beam, there is no fear that the light-shield-side sub-beam will go out of the light receiving surface, thus stabilizing the characteristics of the optical pickup.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a graph showing a relationship between temperature and tracking error balance;

FIG. 8 is a graph showing a relationship between temperature and jitter;

DETAILED DESCRIPTION OF THE PREFERRED EMBODIMENTS

Figure 1:
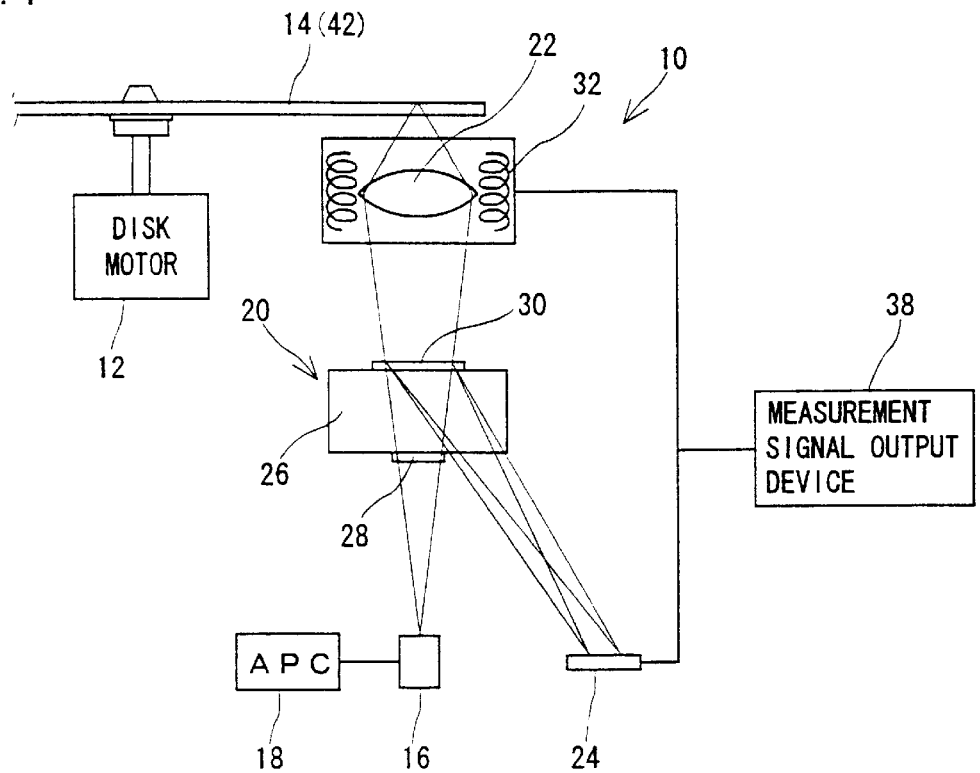
FIG. 1 is an illustrative view showing one embodiment of the present invention.

An optical pickup 10 in this embodiment shown in FIG. 1 is arranged to read information out of a disc 14, such as CD and DVD, being rotated by a disc motor 12, and includes a semiconductor laser element 16 as a light source to emit a predetermined wavelength of laser light. The semiconductor laser element 16 is connected with an APC (Automatic Power Control) 18 so that the APC 18 controls an output of the semiconductor laser element 16. A hologram element 20 and an objective lens 22 are arranged between the semiconductor laser element 16 and the disc 14. A photo-detector 24 is provided obliquely below the hologram element 20.

Figure 3:
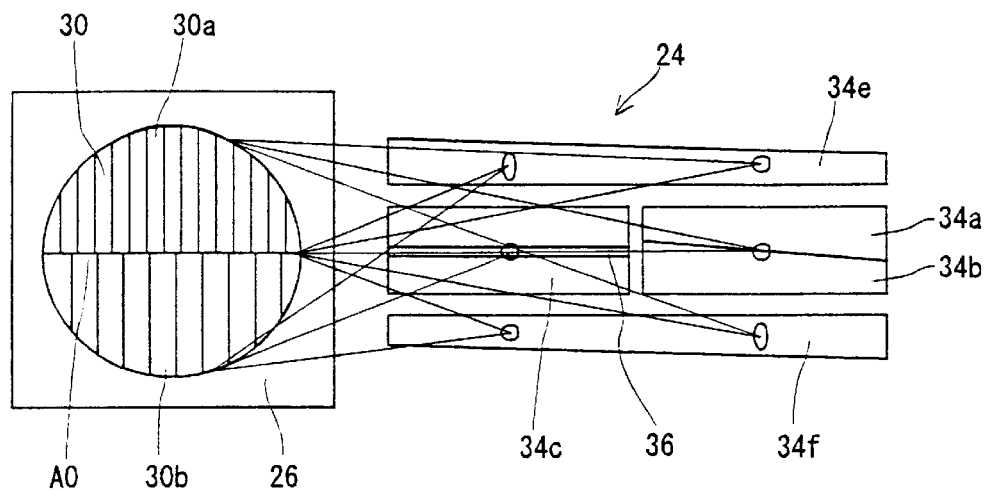
FIG. 3 is an illustrative view showing a relationship in position between the photo-detector and the hologram pattern.

The hologram element 20 includes a substrate 26 formed of a quartz glass or the like, a grating pattern 28 as a beam splitting element formed on a backside of the substrate 26, and hologram pattern 30 for deflecting light formed on a top surface of the substrate 26. The hologram pattern 30 is divided, as shown in FIG. 3, as a first region 30a and a second region 30b by a divisional line AO extending in a radial direction of the disc 14. The regions 30a and 30b are respectively formed with grating patterns with a different period.

The objective lens 22 is fixed on an actuator coil 32 constituting for a focusing actuator so that it is vertically displaced by energizing the actuator coil 32.

Figure 2:
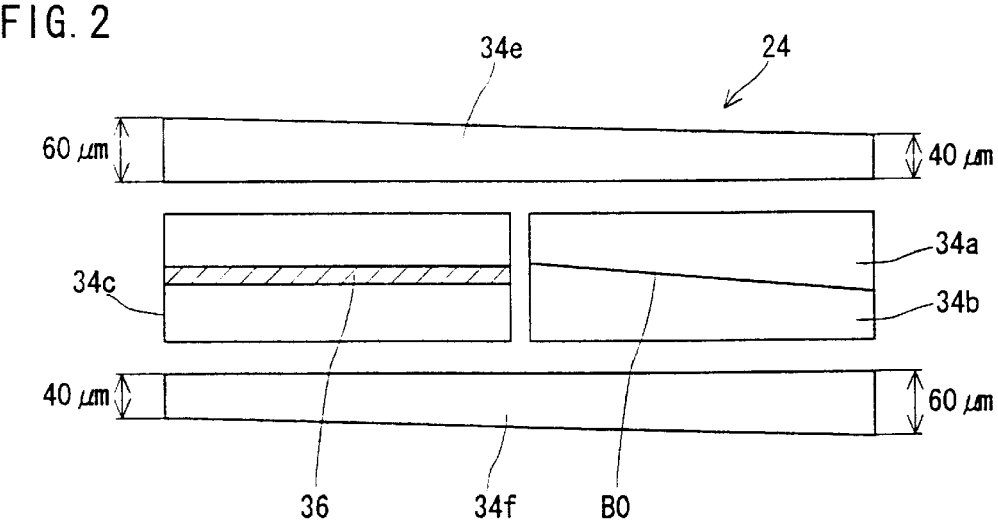
FIG. 2 is an illustrative view showing a photo-detector used in the FIG. 1 embodiment.

The photo-detector 24 is divided, as shown in FIG. 2, into five light receiving elements 34a, 34b, 34c, 34e and 34f. A divisional line separating the light receiving elements 34a and 34b from each other is formed in almost a same direction as a direction of diffraction by the hologram pattern 30 (FIG. 3) but slightly deviated in angle relative to that direction.

Meanwhile, a blind zone 36 for shielding light is formed on a surface of the light receiving element 34c, which extends throughout an entire length in a lengthwise direction almost the same as diffraction direction in a manner almost equally separating the light receiving element 34c. The blind zone 36 has width determined narrower than a spot diameter of a laser beam, e.g. approximately 2–8 $\mu$m for a spot diameter of approximately 10 $\mu$m. The blind zone 36 may be formed through an appropriate process of evaporation, sputtering, plating or the like with using a material, such as a metal (aluminum or the like), dielectric material, oxide, etc. However, a metal is preferred most because it is formable thin while securing sufficient light shield.

Also, sub-beam receiving portions, i.e., light receiving elements 34e and 34f, are formed such that they have a width narrowed at an aperture-side region for receiving an aperture-side portion of light and broadened at a light-shielding side region for receiving a light-shielding side portion of the light.

Figure 4:
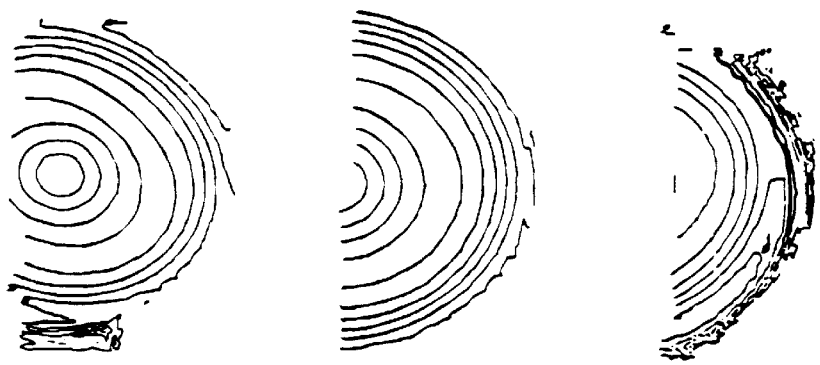
FIG. 4 is an illustrative view depicting spot shapes of a beam split by the hologram pattern.

In general, it is possible to express, as d=1.22 $\lambda$/NA, a spot (Airy disc) diameter d of a beam having a wavelength of $\lambda$ after traveling through an objective lens with a numerical aperture NA. On the other hand, if it is assumed that the NA of the objective lens 22 on a side close to the semiconductor laser 16 is NAL and the NA of a main beam (0th order light) after split by the hologram pattern 30 is NA0, the main beam (0th order light after being split is expressed as NA0 =NAL/2 because it is equally split into two by the hologram pattern 30 as shown in FIG. 4. Accordingly, the main beam (0th order light) has a spot diameter d0=2.44 $\lambda$/NAL. On the other hand, the split into sub-beams (1st order light) is made by the hologram pattern 30 such that a divisional ratio is given, as shown in FIG. 4, by 0.6 (60%) on the aperture side and 0.4 (40%) on the light-shield side, provided that a usual tracking pitch and lens focal distance is adopted. Accordingly, if employing an effective NA, the spot diameter d1 on the aperture-side sub-beam (1st order light) is given by d1=1.22 $\lambda$/0.6 NA=0.83 d0, while the spot diameter d1 of the light-shield-side sub-beam (1st order light) is d1=1.22 $\lambda$/0.4NA=1.25 d0. Thus the spot diameter d1 on the light shield side is approximately 1.5 times greater than the spot diameter d1 on the aperture side.

For this reason, in this embodiment the light receiving elements 34e, 34f have light shielding region for beam reception on a light shield side having a width of 1.5 times broader than a width of its aperture-side region for beam reception on an aperture side. For example, the width of the light shield side region is determined at approximately 60 $\mu$m for a width of 40 $\mu$m of an aperture-side region.

Figure 5:
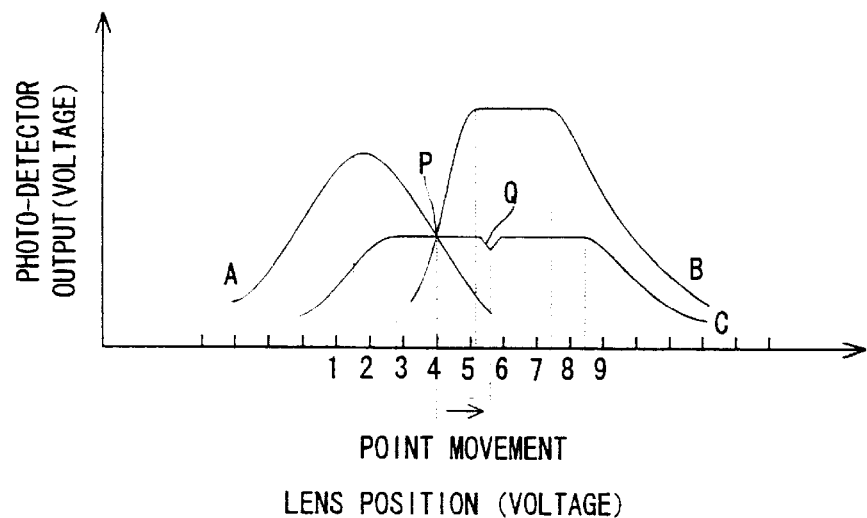
FIG. 5 is a graph showing a relationship between the position of a lens and the output of a photo-detector.

A measurement signal output device 38, e.g. an oscilloscope, is connected to the actuator coil 32 and the light receiving elements 34a, 34f of the photo-detector 24 so that a relationship between an objective lens 22 vertical position, i.e. a position thereof vertical to the disc 14 record surface, and the output of the light receiving element 34a–34c is outputted, displayed, as a graph, for example, as shown in FIG. 5, on the measurement signal output device 38. Note that in FIG. 6 spot 1–9 are shown corresponding to lens positions 1–9 in FIG. 5.

In assembling the optical pickup 10 as stated above, the hologram element 20 and the photo-detector 24 are adjusted in position therebetween by utilizing an adjusting technique as stated below, in order to avoid focus offset and put jitter into an optimum value.

First, a half mirror (or total-reflection mirror) 42 is mounted, in place of the disc 14, on the turntable 40 being rotated by the disc motor 12, and then the semiconductor laser is caused to emit light. Thereupon the laser beam from the semiconductor laser element 16 is diffracted by the grating pattern 28, thereby providing a 0th order diffraction light (main beam) and a 1st order diffraction light (sub-beams). The three beams split by the grating pattern 28 travel through the hologram pattern 30 and then converge on the half mirror 42 through the objective lens 22. The main beam reflected by the half mirror 42, after traveling through the objective lens 22, is diffracted by the hologram pattern 30. A portion of the main beam diffracted by the region 30a of FIG. 3 converges on the region 34c of the photo-detector 24, while a portion of the main beam deflected by the region 30b converges on the regions 34a, 34b. On the other hand, the sub-beams converge on the light receiving elements 34e, 34f.

Then the actuator coil 32 is energized to vertically move the objective lens 22. A graph (FIG. 5) is outputted on the measurement signal output device 38, which represents a relation between a position of the objective lens 22 (actuator coil 32 voltage) and an output of the light receiving elements 34a, 34b and 34c.

Figure 6:
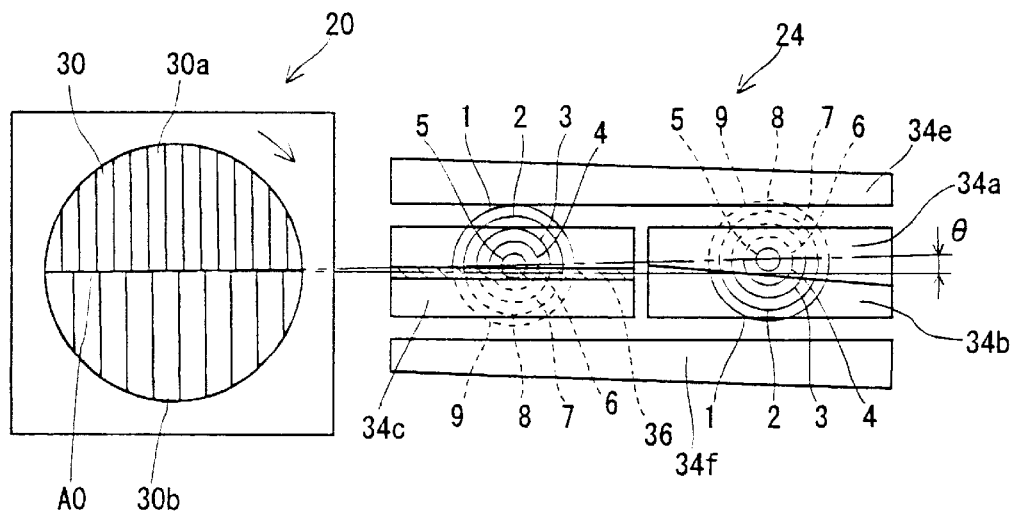
FIG. 6 is an illustrative view showing a method to adjust the relationship in position between the photo-detector and the hologram element.

In a graph of FIG. 5, a point p represents an intersection between a waveform A outputted from the light receiving element 34a and a waveform B outputted from the light receiving element 34b, i.e., a point for which focussing servo is made. On the other hand, a point Q represents a center point within a maximum value range (range that the output value is kept at maximum) of a waveform outputted from the light receiving element 34c, i.e., a point at which the laser pattern assumes minimum in size. This point Q coincides with an edge (voltage drop point) given by the blind zone 36 provided on the light receiving element 34c. Accordingly, if the point p and the edge (point Q) be overlapped with each other, focusing servo is made for that point and further the spot size is reduced to a minimum thus providing an optimal jitter value. In order to realize this, the hologram element 20 is displaced (rotated) such that the intersection p is superimposed on the edge (point Q). Note that FIG. 6 illustrates a state that the hologram element 20 is deviated in angle θ relative to the photo-detector, wherein the point P and the point Q are superimposed on each other if the hologram element 20 is rotated by the angle θ in a direction of an arrow in FIG. 6.

In operating the optical pickup 10, a focusing error signal is determined from a difference (S34a–S34b) between the respective output signals of light receiving elements 34a, 34b, while a tracking error signal is determined from a difference S34e–S34f) of between the respective output signals of the light receiving elements 34e and 34f. A pit signal is determined from a sum (S34a+S34b +S34c) of the respective output signals of the light receiving elements 34a, 34b and 34c.

In this embodiment, because the point P can be superimposed on the point Q by utilizing an edge as a mark during displacing the hologram element 20, it is easy to perform adjustment in position between the hologram element 20 and the photo-detector 24. Also, cost reduction is possible because of no necessity of separately providing a servo circuit, etc. to effect positional adjustment. Furthermore, the optical pickup 10 is stabilized in characteristic because jitter values are optimally obtained through reducing the spot size to a minimum which focus servo is made for.

In the light receiving element 34e, 34f, because the light shield area for lightshield-side sub-beam reception is broader in width than the aperture side region for aperture-side sub-beam reception, there is no fear that the light-shield side sub-beam go out of the light receiving surface. Accordingly, it is possible to prevent the tracking error balance or jitter from being greatly varied by change of temperature, stabilizing the characteristics of the optical pickup 10. FIG. 7 is a graph showing a relationship between temperature and tracking error balance. It can be understood from this graph that the deviation in tracking error balance |E−F|/|E+F| is improved from 22% in the prior art to 3% at −10° C. to 60° C. (provided that E and F are respective output voltages of the light receiving elements 34e, 34f). On the other hand, FIG. 8 is a graph showing a relationship between temperature and jitter is. The reduction in variation of jitter possible because tracking servo is made in a good tracking error balance state and accordingly the beam spot is correctly given on the disc 14 track.

Figure 9:
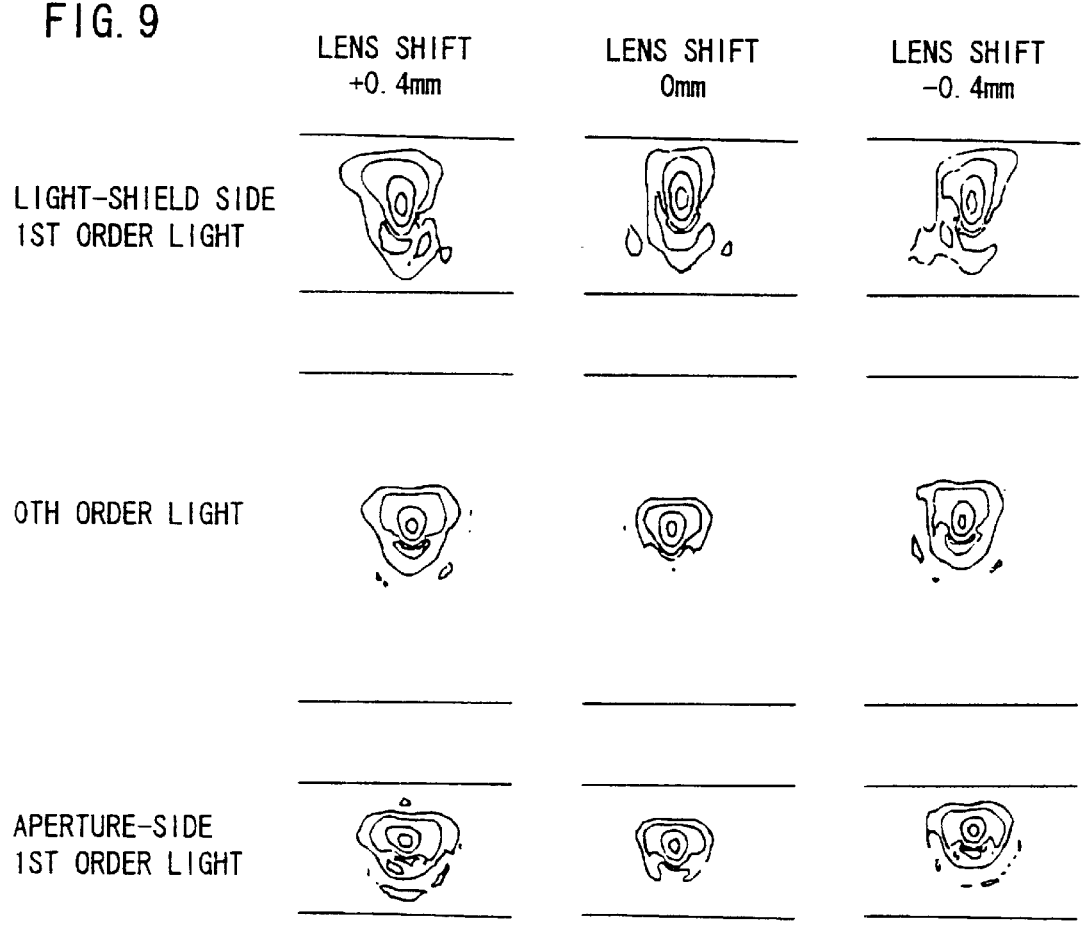
FIG. 9 is an illustrative view showing change in spot shape when shifting a position of an objective lens.

The spot size is varied as shown in FIG. 9 upon deflecting the objective lens 22 in the tracking direction. It has however been confirmed that in the experiment conducted by the present inventors the present embodiment can reduce the variation of tracking error balance as low as 4% when the objective lens 22 is deflected by ±4 mm.

Figure 10:
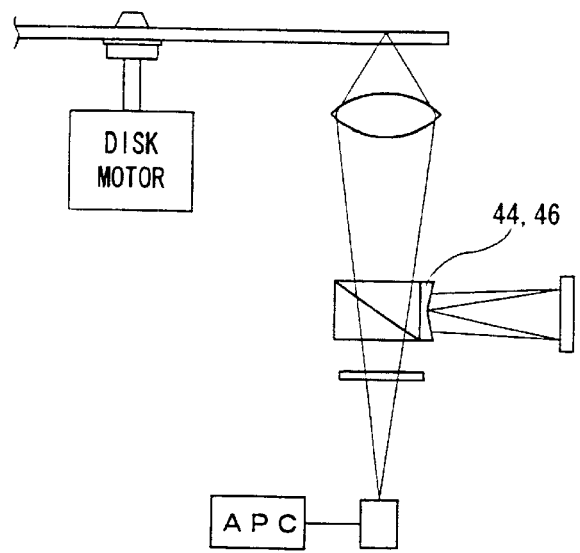
FIG. 10 is an illustrative view showing an optical pickup using a Foucault's prism.
Figure 11:
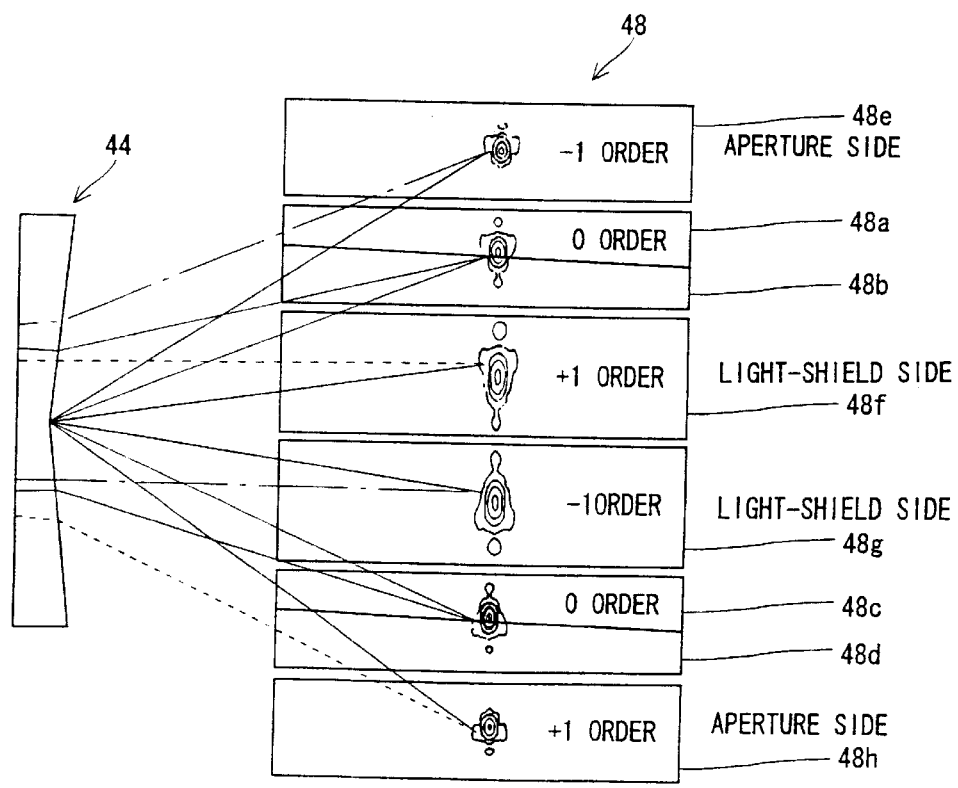
FIG. 11 is an illustrative view showing another embodiment.
Figure 12:
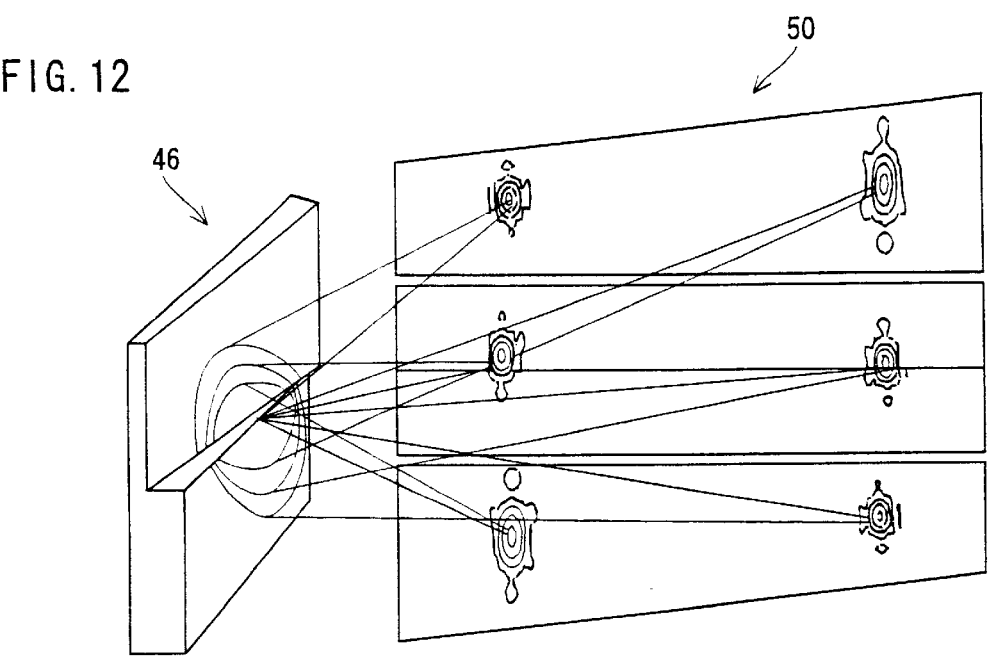
FIG. 12 is an illustrative view showing still another embodiment.
Figure 13:
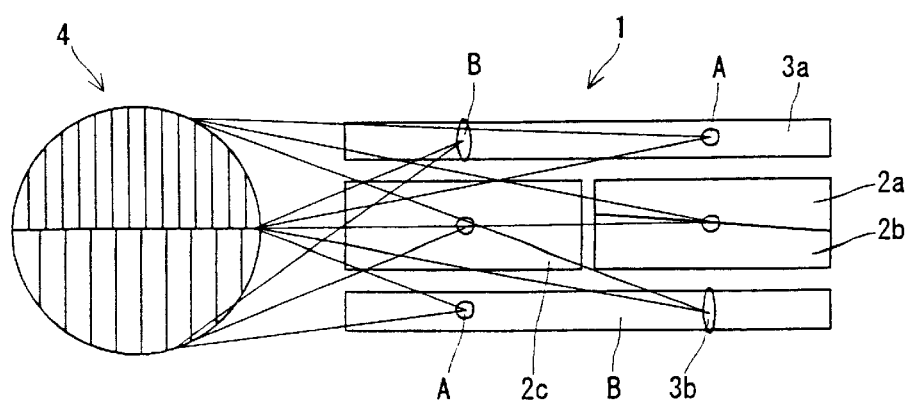
FIG. 13 is an illustrative view showing a prior art.

Incidentally, in the above embodiment the reflection light from the disc 14 was deflected by the hologram pattern 30 on the hologram element 20. However, a Foucault's prism 44 or 46 as shown in FIG. 11 or 12 may be employed in place of a hologram pattern 30, as shown in FIG. 10. The Foucault's prism 44 shown in FIG. 11 is structured by two planes slanted at different angles with respect to a vertical direction, while the Foucault's prism 46 shown in FIG. 12 is formed by two planes slanted at different angles with respect to a horizontal direction. They are different in direction of beam deflection from the hologram pattern 30. When using the Foucault's prism 44 or 46, there is necessity of using a photo-detector 48, 50 made appropriate therefor.

The photo-detector 48 shown in FIG. 11 has light receiving elements 48a–48h arranged in the vertical direction, wherein the light receiving element 48f, 48g having only a light shield side region has a width wider than a width of the light receiving element 48e, 48h having only an aperture side region. Accordingly, it is also possible for this photo-detector 48 to prevent the sub-beam on the light shield side from going out of the light receiving surface, stabilizing the characteristics of the optical pickup 10.

Furthermore, the above embodiment used the hologram element 20 having the grating pattern 28 and hologram pattern 30 both integrally formed on the substrate 26. However, a splitting element and a diffraction element may be arranged respectively at top and bottom in an independent form.

Also, explanation was made on the embodiment to which applied are two features of the invention, i.e., the feature that the blind zone is formed on the light receiving element for receiving a main beam, and the feature that the width is varied in the light receiving element for receiving a sub-beam. However, it is of course possible to separately implement these features according to the invention. It is needless to say that the concept of the invention involves discrete forms of the examples.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup, comprising:
   a laser element for emitting laser light;
   a lens for causing the laser light to converge on a disc;
   a diffraction element having first and second region each of which diffracts reflection light from said disc;
   a photo-detector for receiving the reflection light traveled through said diffraction element, said photo-detector includes a first light receiving element on which the reflection light diffracted by said first region converges, a second light receiving element on which the reflection light diffracted by said second region converges and a third light receiving element, said second light receiving element and said third light receiving element being separated by a divisional line extending almost in a same direction as a direction of diffraction by the second region; and
   a blind zone for dividing a light receiving surface of said first light receiving element into two.

2. An optical pickup according to claim 1 wherein said blind zone is provided to extend in a same direction as a direction of diffraction by said first region over an entire length of said first light receiving element.

3. An optical pickup according to claim 1, wherein said blind zone is formed of a metal on the surface of said first light receiving element.

4. An optical pickup according to claim 1, further comprising a displacing means which causes said lens to displace in a direction perpendicular to a record surface of said disc.

5. An optical pickup according to claim 4, further comprising a measurement signal output device for representing as a graph a relationship between an output of said photo-detector and an output of said displacing means.

6. An optical pickup according to claim 1, further comprising a splitting element which splits a laser beam from said laser element into one main beam and two sub-beams, wherein photo-detector includes a light receiving portion for receiving the sub-beams respectively diffracted by said first and second regions, said light receiving portion having a width broader at a light shield side region for receiving the sub-beam diffracted as a light shield side by said diffraction element than a width at an aperture side region for receiving the sub-beam diffracted as an aperture side.

7. An optical pickup, comprising:
   a splitting element which splits a laser beam from a laser element into one main beam and two sub-beams;
   a lens for causing the main beam and the sub-beams to converge on a disc;
   a diffraction element divided into first and second regions to diffract reflection light from said disc;
   a photo-detector for receiving the reflection light traveled through said diffraction element, said photo-detector including first and second light receiving portions for respectively receiving the main beam and the sub-beams diffracted by said first region and said second region;
   said second light receiving portion being broader in width at a light shield side region, said light shield side region for receiving the sub-beam diffracted from a light shield side of said diffraction element, than a width at an aperture side region, said aperture side region for receiving the sub-beam diffracted from an aperture side of said diffraction element.

8. An optical pickup according to claim 7, wherein the width of said light field side region is 1.5 times greater than the width of said aperture side region.

9. An optical pickup according to claim 7, wherein said diffraction element includes a Foucault's prism.

10. An optical pickup according to claim 7, wherein said second light receiving portion includes a plurality of light receiving elements.

11. An optical pickup according to claim 10, wherein said second light receiving portion includes a light receiving element having only the light shield side region and light receiving element having only the aperture side region.

12. An optical pickup according to claim 10, wherein said second light receiving portion includes a light receiving element having both the light receiving side region and the aperture side region.

13. An optical pickup according to claim 7, wherein said first light receiving portion includes a first light receiving element on which the main beam diffracted by said first region converges, a second light receiving element on which the main beam diffracted by said second region converges and a third light receiving element, said first light receiving element including a blind zone to divide a light receiving surface into two.

* * * * *